US012623524B2

(12) United States Patent
Luedtke et al.

(10) Patent No.: US 12,623,524 B2
(45) Date of Patent: May 12, 2026

(54) SIDE DOOR WINDOW STRUCTURE OF MOTOR VEHICLE

(71) Applicant: WUHAN LOTUS CARS CO., LTD., Hubei (CN)

(72) Inventors: Thorsten Luedtke, Raunheim (DE); Wolfgang Rasel, Rüdesheim (DE)

(73) Assignee: WUHAN LOTUS CARS CO., LTD., Wuhan (CN)

( * ) Notice: Subject to any disclaimer, the term of this patent is extended or adjusted under 35 U.S.C. 154(b) by 294 days.

(21) Appl. No.: 18/259,537

(22) PCT Filed: Dec. 28, 2020

(86) PCT No.: PCT/CN2020/140394
§ 371 (c)(1),
(2) Date: Jun. 27, 2023

(87) PCT Pub. No.: WO2022/140991
PCT Pub. Date: Jul. 7, 2022

(65) Prior Publication Data
US 2023/0373280 A1     Nov. 23, 2023

(51) Int. Cl.
B60J 10/77          (2016.01)
B60J 10/23          (2016.01)
B60J 10/79          (2016.01)
(52) U.S. Cl.
CPC .............. B60J 10/77 (2016.02); B60J 10/23 (2016.02); B60J 10/79 (2016.02)
(58) Field of Classification Search
CPC ... B60J 10/77; B60J 10/79; B60J 1/008; B60J 10/23

(Continued)

(56) References Cited

U.S. PATENT DOCUMENTS 4,744,174 A * 5/1988 Mesnel .................... B60J 10/79
49/377
9,038,319 B2 5/2015 Kuwabara
(Continued)

FOREIGN PATENT DOCUMENTS

CN          2476438          2/2002
CN          101332792          12/2008
(Continued)

OTHER PUBLICATIONS

Translation of CN110893748 (Year: 2025).*

(Continued)

*Primary Examiner* — Jason S Morrow
(74) *Attorney, Agent, or Firm* — JCIPRNET

(57)          ABSTRACT

The invention relates to a side door window structure of a motor vehicle, comprising a side door with a side door window and an area of vehicle body, which is arranged close to the side door window, wherein the side door window is moveable upward and downward and arranged frameless in the side door, wherein the side door window comprising at least two glass planes, an inside glass plane and an outside glass plane, wherein an upside end of the outside glass plane is lower than an upside end of the inside glass plane, wherein an outer surface of the outside glass plane is arranged flush with an outer surface of a roof skin of the vehicle body and/or any attached to the roof skin decorative trim part in a closed mode of the side door and the side door window, wherein inside glass plane reaches in the closed position of the side door and the side door window inside a channel and the outside glass plane is arranged outside the channel.

9 Claims, 2 Drawing Sheets

(58) Field of Classification Search

USPC ........................................................ 296/146.3

See application file for complete search history.

(56) References Cited

U.S. PATENT DOCUMENTS

| | | | |
|---|---|---|---|
| 10,266,043 | B2 | 4/2019 | Kobayashi et al. |
| 10,953,636 | B2 * | 3/2021 | Notsu .......................... B32B 3/02 |
| 11,254,102 | B2 * | 2/2022 | Aoki ............................ B60J 1/00 |
| 2012/0055094 | A1 | 3/2012 | Iacovoni et al. |
| 2012/0085029 | A1 | 4/2012 | Stockschlager et al. |
| 2013/0312330 | A1 | 11/2013 | Strurgell |
| 2014/0349058 | A1 * | 11/2014 | Inoue ................. B32B 17/10036 83/13 |

FOREIGN PATENT DOCUMENTS

| | | | | |
|---|---|---|---|---|
| CN | 102409933 | A | | 4/2012 |
| CN | 103171412 | A | | 6/2013 |
| CN | 107585006 | A | | 1/2018 |
| CN | 109311743 | A | | 2/2019 |
| CN | 209096435 | U | | 7/2019 |
| CN | 110154705 | | | 8/2019 |
| CN | 209938276 | U | * | 1/2020 |
| CN | 110834525 | A | | 2/2020 |
| CN | 110893748 | A | * | 3/2020 ............ B60J 1/2094 |
| CN | 111301130 | A | | 6/2020 |
| CN | 111315952 | | | 6/2020 |
| CN | 112118980 | | | 12/2020 |
| DE | 4221613 | A1 | * | 1/1994 .............. B60J 1/001 |
| DE | 102020128575 | A1 | * | 5/2022 ................ B60J 1/17 |
| GB | 2123884 | A | * | 2/1984 .............. B60J 10/24 |
| GB | 201311352 | | | 8/2013 |
| GB | 2515525 | A | | 12/2014 |
| TW | 539630 | B | | 7/2003 |
| WO | 2017110560 | | | 6/2017 |

OTHER PUBLICATIONS

Translation of CN209938276 (Year: 2025).*

Extended European Search Report for Application No. PCT/CN2020/140394, mailed on Aug. 23, 2024, in 7 pages.

International Search Report and Written Opinion of the International Searching Authority for International Application No. PCT/CN2020/140394, mailed on Sep. 28, 2021, in 6 pages.

"The First Office Action of China Counterpart Application", issued on Nov. 29, 2025, with English translation thereof, p. 1-p. 15.

"Second Office Action of China Counterpart Application", issued on Mar. 1, 2026, with English translation thereof, p. 1-p. 16.

* cited by examiner

SIDE DOOR WINDOW STRUCTURE OF MOTOR VEHICLE

CROSS-REFERENCE TO RELATED APPLICATIONS

This application is the U.S. National Phase under 35 U.S.C. § 371 of International Application No. PCT/CN2020/140394, filed Dec. 28, 2020, titled SIDE DOOR WINDOW STRUCTURE OF MOTOR VEHICLE, the entirety of each of which is hereby expressly incorporated by reference herein.

TECHNICAL FIELD

The invention relates to a side door window of a motor vehicle.

BACKGROUND ART

In current side door window structures the outer surface of the side door window glass is usually executed with an offset between an outer surface of an outside glass pane and an outer styling surface of the vehicle body. This leads to an uneven appearance of the vehicle body, but body excellence is a key selling point for high class and luxury vehicles.

Additionally, does the uneven body surface lead to air turbulence at the edges, which lead to a higher energy consumptions when driving and an increased background noise in comparison to a body without height differences.

CN 209 938276 U reveals a solution wherein the side glass window comprising a laminated glass with two glass panes, namely an inside glass pane and an outside glass pane. The outer surface of the outside glass pane is arranged flush with an outside surface of the side doorframe. However, it is increasingly desirable to design doors without a frame.

SUMMARY OF INVENTION

Technical Problem

Therefore, the task of the invention is to overcome the disadvantages of the state of the art and provide a side glass window structure, which enables a flush positioning of the side glass window to the vehicle body.

SOLUTION TO PROBLEM

Technical Solution

Main features of the invention are specified as follows.

The invention concerns a side door window structure of a motor vehicle, comprising a side door with a side door window and an area of vehicle body, which is arranged close to the side door window, wherein the side door window is moveable upward and downward and arranged frameless in the side door, wherein the side door window comprising at least two glass panes, an inside glass pane and an outside glass pane, wherein an upside end of the outside glass pane is lower than an upside end of the inside glass pane, wherein an outer surface of the outside glass pane is arranged flush with an outer surface of a roof skin of the vehicle body and/or any attached to the roof skin decorative trim part in a closed mode of the side door and the side door window, wherein, inside glass pane, especially the upside end of the inside glass pane, reaches in the closed position of the side door and the side door window inside a channel and the outside glass pane is arranged outside the channel in the closed position of the side door and the side door window.

The definition of the arrangement of the inside glass pane, outside glass pane and outer surfaces takes place from a view of the vehicle interior. The inside glass pane is oriented to the inside of the vehicle. The outside glass pane is oriented to the outside of the vehicle.

The area of vehicle body is formed by the side door window surrounding parts of the vehicle body, for example parts of the roof top. The roof skin forms the outer surface of the roof top.

The invention leads to a side door window structure for a frameless arrangement, wherein an outer surface of the side door window is at least flush with an outer surface of the roof skin of the vehicle body. This lead to an even appearance of the vehicle outside and the vehicle body. This is of special relevance for high-class and luxury vehicle.

While opening the side door of the inventive side door window structure, the side door window is moved upwards for the length of the inside glass pane which is inside the channel. The movement of the side door window is for example linked to the operation of the door handle.

In a preferred embodiment, the channel is attached to an end area of the roof top, especially to an end area of the roof skin. Especially, the outer surface of the channel is arranged flush with the outer surface of the roof skin. This leads to an even appearance of the vehicle surface.

Preferably, the attached channel is hold by an end area of the roof skin, which is folded around an ending of the outer side wall of the channel.

In an alternative embodiment, the roof skin forms the channel, especially the channel is formed by folded sheet material of the roof skin. Through this embodiment, the channel is flush with the roof skin, because it is formed out of the roof skin. This is an easy and inexpensive way to produce a channel for the inside glass pane of the side door window.

In a preferred embodiment, the channel has an essentially U-shape. Especially, is the channel formed as an upside down U with an open side showing downwards. Preferably, the U-shaped channel is formed by three essentially rigid walls, an inner side wall, an outer side wall and a middle, connecting wall. The inner side wall and the outer side wall may have different leg lengths.

This channel shape is easily producible and low in cost. Additionally, does this channel shape enable a correct positioning of the inside glass pane inside the channel. Preferable, the inside glass pane, which is positioned in the channel when the side door and the side door window is closed, pushes against the outer side wall of the channel.

In a preferred embodiment at least one inside-seal is arranged inside the channel and is in contact with the inside glass pane of the side door window in the closed position of the side door and the side door window.

In a further embodiment, more than one inside-seal is arranged inside the channel and interact with the inside glass pane of the side door window while the side door and the side door window is closed.

For example the one or more inside-seals has a part, which is formed as a bent finger, pushing against the inner surface of the inside glass pane, while the inside glass pane is positioned in the channel. This is the case when the side door and also the side door window is completely closed.

Furthermore, in a preferred embodiment an outside-seal is arranged between the upside end of the outside glass pane and an outer sidewall of the channel. This improves the tightness between the side door window and the interior of the vehicle.

Preferably, an offset between the upside end of the outside glass pane and the upside end of the inside glass pane is essentially the same as the intersection of the outer sidewall of the channel and the upside end of the inside glass pane in addition with the thickness of the outside-seal. This leads to a good tightness and stable arrangement of the side door window and the surrounding body area.

In a further preferred embodiment the outside glass pane has a thickness, which is larger than a thickness of the inside glass pane. A larger thickness of the outside glass pane enables a flush arrangement of the outer surface of the outside glass pane to the outer surface of the roof skin, wherein for example a standard thickness can be used for the inside glass pane. Especially, enables the use of a thicker outside glass pane the use of more metal sheet for attachment of the channel to the roof top or forming of the channel out of the roof skin sheet.

Preferably, the outside glass pane has a thickness more than 2.6 mm. Standard glass pane thicknesses used for side door windows in vehicles are about 2.6 mm, which is often not enough to form a flush arrangement to the roof skin. Especially, this leads to very thin areas for formation of the channel and therefore to instability.

Therefore, this thickness of more than 2.6 mm of the outside glass pane enables a flush positioning of the outer surface of the outside glass pane with an outer surface of the roof skin. Additionally, does this thickness of more than 2.6 mm enables to use more material, especially more sheet material, for formation of the channel and formation of a flush arrangement between roof skin and outer surface of the side door window.

In an alternative embodiment the outside glass pane has a thickness, which is the same as the inside glass pane. This enables to use two glass panes of the same kind in production of the side door window.

In a preferred embodiment the side door window comprises an interlayer, which is arranged between the inside glass pane and the outside glass pane.

A glass, for example a side glass window, made of at least two glass panes and an interlayer between is called laminated glass. This is preferred for safety reasons and is also used to increase the sound insulation rating of a window, where it significantly improves sound attenuation compared to monolithic glass panes of the same thickness.

Preferable, the interlayer consists of a polymer, for example polyvinyl butyral (PVB), ethylene-vinyl acetate (EVA) or Thermoplastic Polyurethane (TPU).

ADVANTAGEOUS EFFECTS OF INVENTION

Advantageous Effects

The invention leads to a side door window structure for a frameless arrangement, wherein an outer surface of the side door window is at least flush with an outer surface of the roof skin of the vehicle body. This lead to an even appearance of the vehicle outside and the vehicle body. This is of special relevance for high-class and luxury vehicle.

BRIEF DESCRIPTION OF DRAWINGS

Description of Drawings

Figure 1:
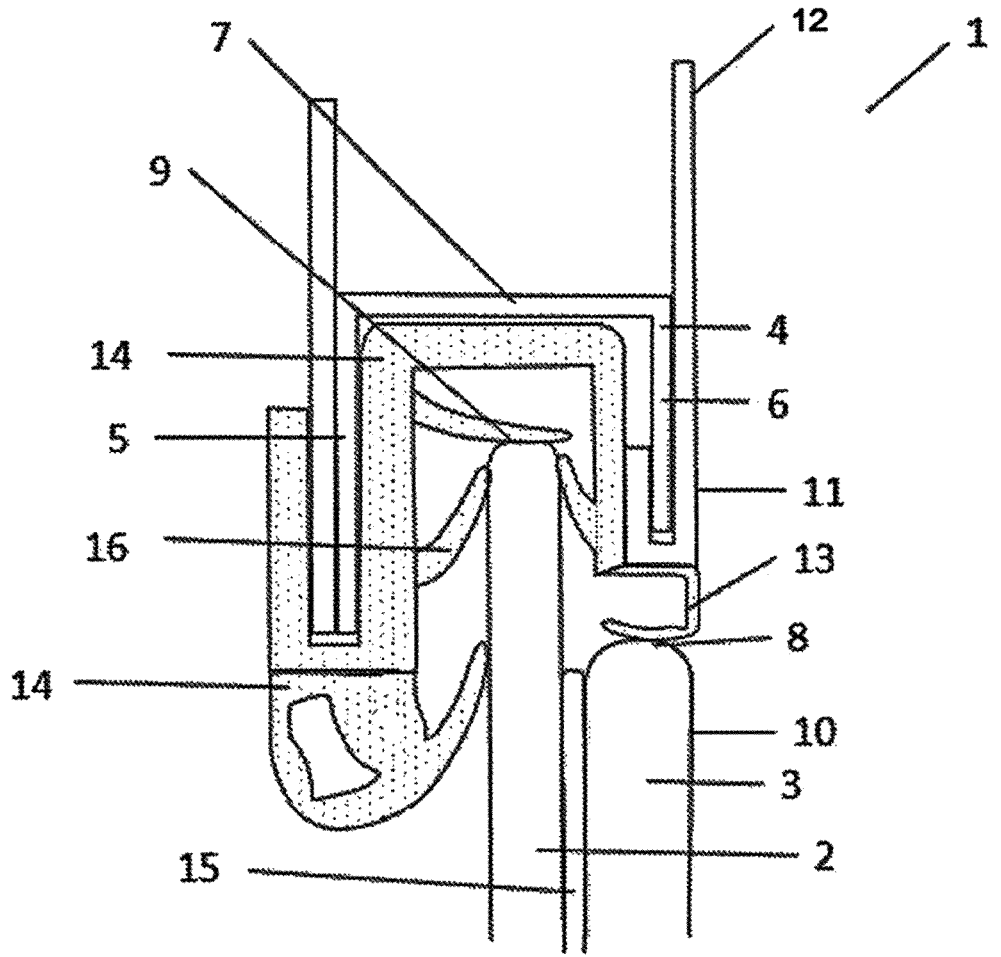
Figure 2:
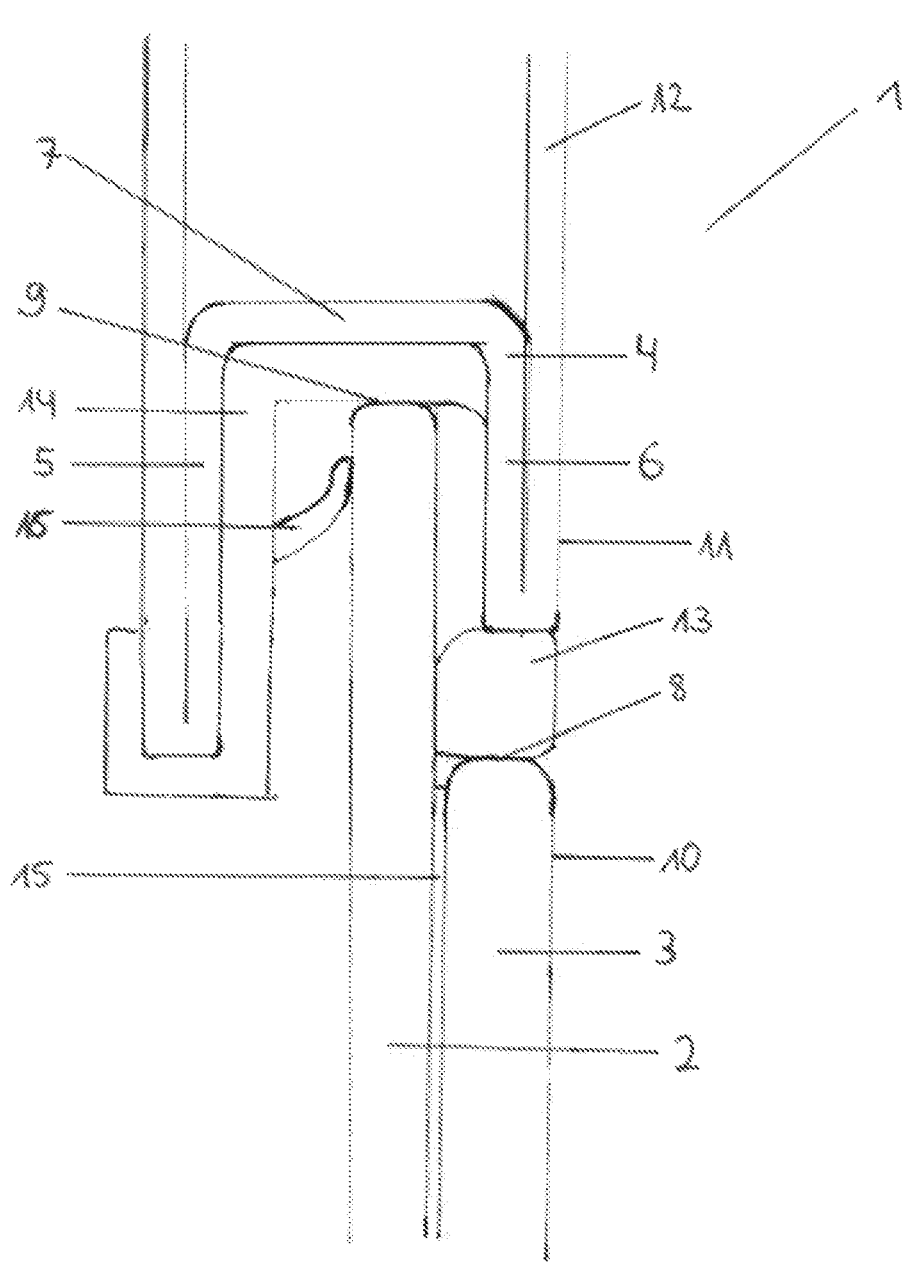

The following description of exemplary embodiments, the wording of the claims and the drawings provide further features, details and advantages of the invention. The figures shows:

FIG. 1 schematic sectional view of a side door window structure,

FIG. 2 schematic sectional view of another embodiment of the side door window structure.

BEST MODE FOR CARRYING OUT THE INVENTION

Best Mode

FIG. 1 shows a schematic sectional view of a side door window structure 1 with at least two glass panes—an inside glass pane 2 and an outside glass pane 3. The side door window structure 1 is shown in a closed position, wherein the longer inside glass pane 2 reaches inside an essentially U-shaped channel 4. The channel comprises an inner side wall 5, an outer side wall 6 and a middle, connecting wall 7. The channel 4 in FIG. 1 is formed by a separate component and attached to the roof skin 12, especially by folding the roof skin 12 sheet around an ending of the outer side wall 6.

An upside end 8 of the outside glass pane 3 is lower than an upside end 9 of the inside glass pane 2. Further on, an outer surface 10 of the outside glass pane 3 is arranged flush with an outer surface 11 of a roof skin 12 of the vehicle body.

In the shown embodiment the outside glass pane 3 has a thickness, which is larger than a thickness of the inside glass pane 2.

Between the outer side wall 6 of the channel 4 and the upside end 8 of the outside glass pane 3 an outside-seal 13 is arranged.

In this embodiment two inside-seals 14 are arranged inside the channel 4 and are in contact with the inside glass pane 2 of the side door window in the closed position of the side door and the side door window. The inside-seals 14 stabilizes the inside glass pane 2 in the channel 4. Parts of the inside-seals are formed like a bent fingers 16, which push against the inside glass pane 2.

The offset from upside end 8 of the outside glass pane 3 to the upside end 9 of the inside glass pane 3 is essentially the same as length of the outer side wall 6 of the channel 4 plus the thickness of the outside-seal 13 less a thickness of the inside-seal 14.

Additionally, an interlayer 15 is arranged between the inside glass pane 2 and the outside glass pane 3.

FIG. 2 shows a schematic sectional view of a second embodiment of the side door window structure 1. In this embodiment the channel 4 is formed by the roof skin 12 sheet.

The invention is not limited to one of the described embodiments, but can be modified in many ways. All features and advantages resulting from the claims, the description and the drawing, including constructional details, spatial arrangements and procedural steps, may be essential to the invention, both individually and in various combinations.

REFERENCE SIGNS LIST

1: side door window structure; 2: inside glass pane; 3: outside glass pane; 4: channel; 5: inner side wall; 6: outer side wall; 7: middle wall; 8: upside end of the outside glass pane; 9: upside end of the inside glass pane; 10: outer surface of the outside glass pane; 11: outer surface of the roof skin; 12: roof skin; 13: outside-seal; 14: inside-seal; 15: interlayer; 16: bent finger.

What is claimed is:

1. A side door window structure of a motor vehicle, comprising a side door with a side door window and an area of vehicle body, which is arranged close to the side door window, wherein the side door window is moveable upward and downward and arranged frameless in the side door, wherein the side door window comprising at least two glass panes, an inside glass pane and an outside glass pane, wherein an upside end of the outside glass pane is lower than an upside end of the inside glass pane, wherein an outer surface of the outside glass pane is arranged flush with an outer surface of a roof skin of the vehicle body and/or decorative trim part attached to the roof skin in a closed position of the side door and the side door window, wherein inside glass pane reaches in the closed position of the side door and the side door window inside a channel and the outside glass pane is arranged outside the channel, wherein the channel is formed as a separate component and attached to the roof skin or the channel and the roof skin are integrally formed, when the channel is formed by a separate component and attached to the roof skin, an end portion of the channel is held by an end portion of the roof skin, and the end portion of the roof skin is folded around the end portion of the channel, when the channel and the roof skin are integrally formed, the channel is formed by a folded sheet material of the roof skin.

2. The side door window structure according to claim 1, wherein the channel has an essentially U-shape.

3. The side door window structure according to claim 2, wherein the U-shaped channel is formed by three essentially rigid walls that are an inner side wall, an outer side wall and a middle, connecting wall.

4. The side door window structure according to claim 1, wherein at least one inside-seal is arranged inside the channel and is in contact with the inside glass pane of the side door window in the closed position of the side door and the side door window.

5. The side door window structure according to claim 1, wherein an outside-seal is arranged between the upside end of the outside glass pane and an outer side wall of the channel.

6. The side door window structure according to claim 5, wherein an offset from upside end of the outside glass pane to the upside end of the inside glass pane is essentially the same as length of the outer side wall of the channel plus the thickness of the outside-seal less the thickness of an inside-seal.

7. The side door window structure according to claim 1, wherein the outside glass pane has a thickness, which is larger than a thickness of the inside glass pane.

8. The side door window structure according to claim 1, wherein the outside glass pane has a thickness more than 2.6 mm.

9. The side door window structure according to claim 1, wherein the side door window comprises an interlayer, which is arranged between the inside glass pane and the outside glass pane.

* * * * *